US008449182B2

(12) United States Patent
Hao

(10) Patent No.: US 8,449,182 B2
(45) Date of Patent: May 28, 2013

(54) TEMPERATURE SENSING MODULE

(75) Inventor: Chien-Feng Hao, Dong-Guan (CN)

(73) Assignees: Delta Electronics, Inc., Taoyuan Hsien (TW); Delta Electronics Components (Dongguan) Co., Ltd., Dong-Huan (CN)

( * ) Notice: Subject to any disclaimer, the term of this patent is extended or adjusted under 35 U.S.C. 154(b) by 281 days.

(21) Appl. No.: 13/095,403

(22) Filed: Apr. 27, 2011

(65) Prior Publication Data

US 2011/0268154 A1    Nov. 3, 2011

(30) Foreign Application Priority Data

Apr. 30, 2010  (CN) .......................... 2010 1 0162691

(51) Int. Cl.
*G01K 1/00* (2006.01)
*G01K 7/00* (2006.01)

(52) U.S. Cl.
USPC ........................................... 374/208; 374/185

(58) Field of Classification Search
USPC ................................................. 374/208, 185
See application file for complete search history.

(56) References Cited

U.S. PATENT DOCUMENTS

| | | | | | |
|---|---|---|---|---|---|
| 5,167,519 | A | * | 12/1992 | Jones et al. .................... | 439/259 |
| 5,372,427 | A | * | 12/1994 | Padovani et al. .............. | 374/185 |
| 5,993,061 | A | * | 11/1999 | Drouet .......................... | 374/208 |
| 6,227,703 | B1 | * | 5/2001 | DiMatteo et al. ............. | 374/208 |
| 7,549,790 | B2 | * | 6/2009 | Ye et al. .......................... | 374/43 |
| 7,637,659 | B2 | * | 12/2009 | Liu et al. ....................... | 374/208 |
| 2002/0048312 | A1 | * | 4/2002 | Schurr et al. .................. | 374/208 |
| 2004/0037350 | A1 | * | 2/2004 | Parmicza et al. ............. | 374/163 |
| 2005/0129089 | A1 | * | 6/2005 | Glozman et al. ............. | 374/185 |
| 2009/0232186 | A1 | * | 9/2009 | Li et al. .......................... | 374/208 |
| 2010/0067562 | A1 | * | 3/2010 | Wakabayashi ............... | 374/208 |

FOREIGN PATENT DOCUMENTS

JP            60192247   A   *   9/1985

* cited by examiner

*Primary Examiner* — Mirellys Jagan
(74) *Attorney, Agent, or Firm* — Kirton McConkie; Evan R. Witt

(57) ABSTRACT

A temperature sensing module includes a thermal sensor and an auxiliary fixture member. The thermal sensor includes a sensing head and plural pins. The pins and respective wires are connected with each other to form plural connecting regions. The auxiliary fixture member includes a fixing part, an extension part, a receiving part and a covering part. The extension part includes plural grooves for partially accommodating the pins of the thermal sensor, the wires and the connecting regions. The receiving part is arranged between the fixing part and the extension part for accommodating the sensing head of the thermal sensor. The covering part is disposed over the extension part for covering the extension part so that the pins, the wires and the connecting regions accommodated within the grooves of the extension part are fixed between the extension part and the covering part.

20 Claims, 5 Drawing Sheets

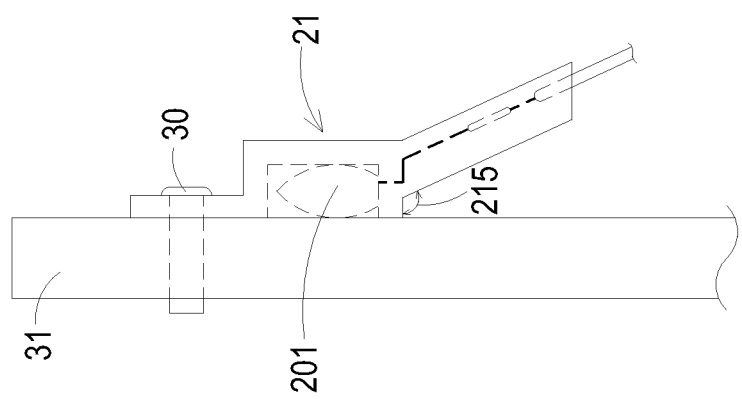

TEMPERATURE SENSING MODULE

FIELD OF THE INVENTION

The present invention relates to a sensing module, and more particularly to a temperature sensing module.

BACKGROUND OF THE INVENTION

With increasing development of science and technology, a variety of power supply apparatuses or electronic devices are developed toward minimization, high integration and high power. If the heat generated by the electronic components fails to be effectively dissipated away, the elevated operating temperature may result in damage, reduced use life or deteriorated performance of the electronic components. For effectively removing the heat, the power supply apparatus or the electronic device should be equipped with a forced convection mechanism to exhaust the heat to the ambient air. The common forced convection mechanism is for example a fan.

Generally, the rotating speed of the fan is adjusted according to the temperature sensed by a thermistor, which is usually attached on a heat sink. FIG. 1A is a schematic perspective view illustrating a conventional temperature sensing module, in which the insulating tubes are not shown. As shown in FIG. 1A, the temperature sensing module 1 comprises an auxiliary fixture member 10 and a thermistor 11. The auxiliary fixture member 10 comprises a receiving part 101 and a fixing part 102. The receiving part 101 and the fixing part 102 are integrally formed. The receiving part 101 is a hollow structure with an opening 1011 and plural perforations 1012. The fixing part 102 has a screw hole 1021. In addition, the thermistor 11 comprises a sensing head 111 and plural pins 112.

FIG. 1B is a schematic assembled view illustrating a conventional temperature sensing module of FIG. 1A. Hereinafter, a process of assembling the conventional temperature sensing module 1 will be illustrated with reference to FIGS. 1A and 1B. Firstly, the pins 112 of the thermistor 11 are penetrated through respective perforations 1012 of the receiving part 101, and the sensing head 111 of the thermistor 11 is accommodated within the receiving part 101. Then, the pins 112 of the thermistor 11 are connected with respective wires 12 by welding. Then, the welding regions (not shown) between the pins 112 and the corresponding wires 12 are covered by a metallic sheet (e.g. a copper sheet) to form corresponding riveting parts 13. For electrical safety, the pins 112, the riveting parts 13 and the wires 12 are covered by corresponding insulating tubes 14. Afterwards, by penetrating a fastening element (not shown) through the screw hole 1021 of the fixing part 102 and tightening the fastening element in a corresponding screw hole (not shown) of a heat sink, the auxiliary fixture member 10 is fixed on the heat sink. Meanwhile, the receiving part 101 and the sensing head 111 of the thermistor 11 are attached on the surface of the heat sink. Consequently, the rotating speed of the fan may be adjusted according to the temperature sensed by the thermistor 11.

From the above discussions, it is found that the process of assembling the conventional temperature sensing module 1 is complicated, labor-intensive and time-consuming. Moreover, due to the inherent tolerance of the thermistor 11, the sensing head 111 of the thermistor 11 sometimes fails to be completely attached on the surface of the heat sink. Under this circumstance, the temperature of the heat sink fails to be accurately acquired, and thus the rotating speed of the fan fails to be precisely controlled. In addition, since the pins 112 of the thermistor 11 are connected with respective wires 12 by welding, solder icicles (not shown) are possibly generated in the welding regions. If the insulating tubes 14 are pierced by the solder icicles, a short-circuited problem possibly occurs and thus the reliability of the electronic device is deteriorated.

Therefore, there is a need of providing an improved temperature sensing module to obviate the drawbacks encountered from the prior art.

SUMMARY OF THE INVENTION

It is an object of the present invention to provide a temperature sensing module, which can be easily assembled and effectively attached on a surface of a heat sink.

It is a further object of the present invention to provide a temperature sensing module with enhanced reliability and electrical safety.

In accordance with an aspect of the present invention, there is provided a temperature sensing module. The temperature sensing module includes a thermal sensor and an auxiliary fixture member. The thermal sensor includes a sensing head and plural pins. The pins and respective wires are connected with each other to form plural connecting regions. The auxiliary fixture member includes a fixing part, an extension part, a receiving part and a covering part. The extension part includes plural grooves for partially accommodating the pins of the thermal sensor, the wires and the connecting regions. The receiving part is arranged between the fixing part and the extension part for accommodating the sensing head of the thermal sensor. The covering part comprises plural ribs corresponding to the grooves and plural buckling structures, wherein after the covering part is assembled with the extension part by the buckling structures, the pins, the wires and the connecting regions accommodated within the grooves of the extension part are pressed by the ribs.

In accordance with another aspect of the present invention, there is provided an auxiliary fixture member for facilitating fixing a thermal sensor on a surface of a heat sink. The thermal sensor includes a sensing head and plural pins. The pins and respective wires are connected with each other to form plural connecting regions. The auxiliary fixture member includes a fixing part, an extension part, a receiving part and a covering part. The extension part includes plural grooves for partially accommodating the pins of the thermal sensor, the wires and the connecting regions. The receiving part is arranged between the fixing part and the extension part for accommodating the sensing head of the thermal sensor. The covering part comprises plural ribs corresponding to the grooves and plural buckling structures, wherein after the covering part is assembled with the extension part by the buckling structures, the pins, the wires and the connecting regions accommodated within the grooves of the extension part are pressed by the ribs.

The above contents of the present invention will become more readily apparent to those ordinarily skilled in the art after reviewing the following detailed description and accompanying drawings, in which:

BRIEF DESCRIPTION OF THE DRAWINGS

FIG. 3 is a schematic cross-sectional view illustrating the temperature sensing module of FIG. 2 fixed on a heat sink.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
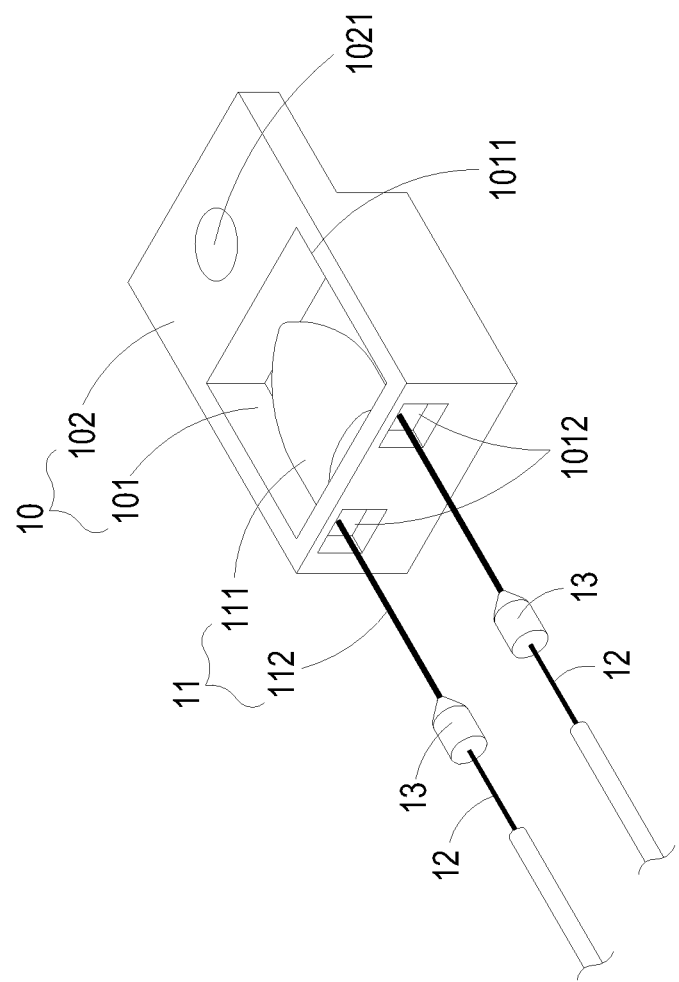
FIG. 1A is a schematic perspective view illustrating a conventional temperature sensing module, in which the insulating tubes are not shown.
Figure 1B:
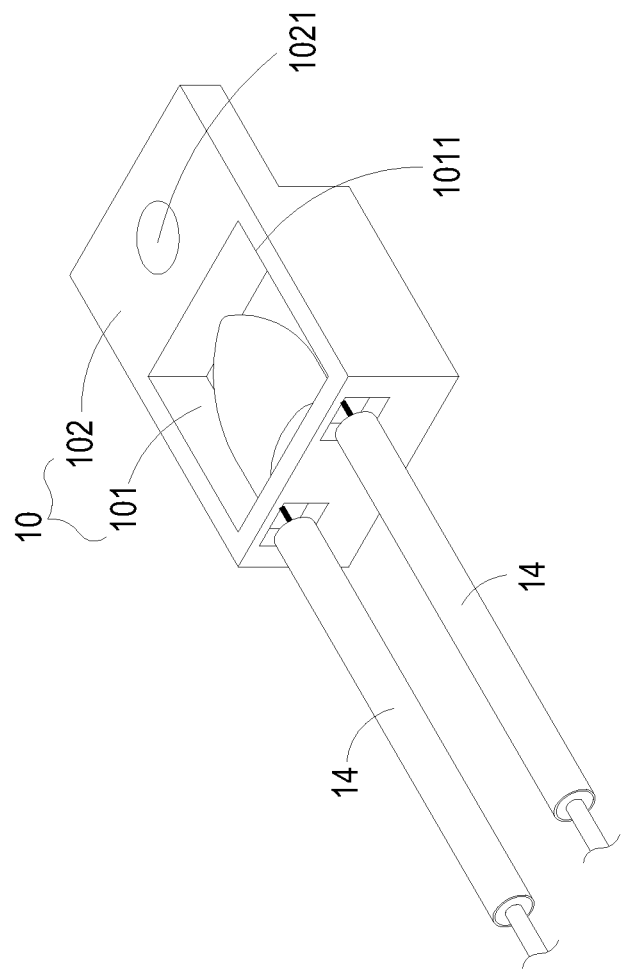
FIG. 1B is a schematic assembled view illustrating a conventional temperature sensing module of FIG. 1A.
Figure 2A:
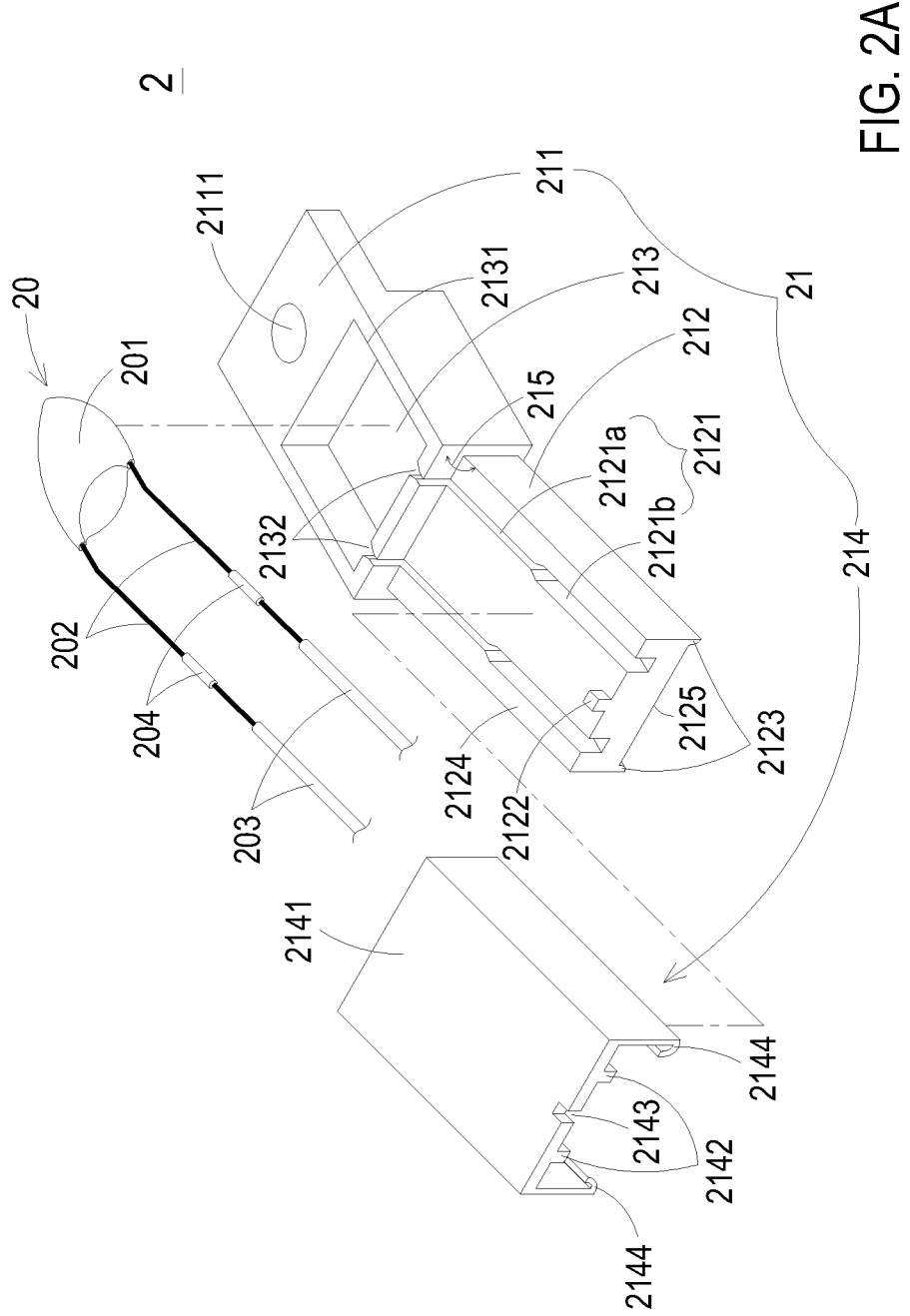
FIG. 2A is a schematic exploded view illustrating a temperature sensing module according to an embodiment of the present invention.
Figure 2B:
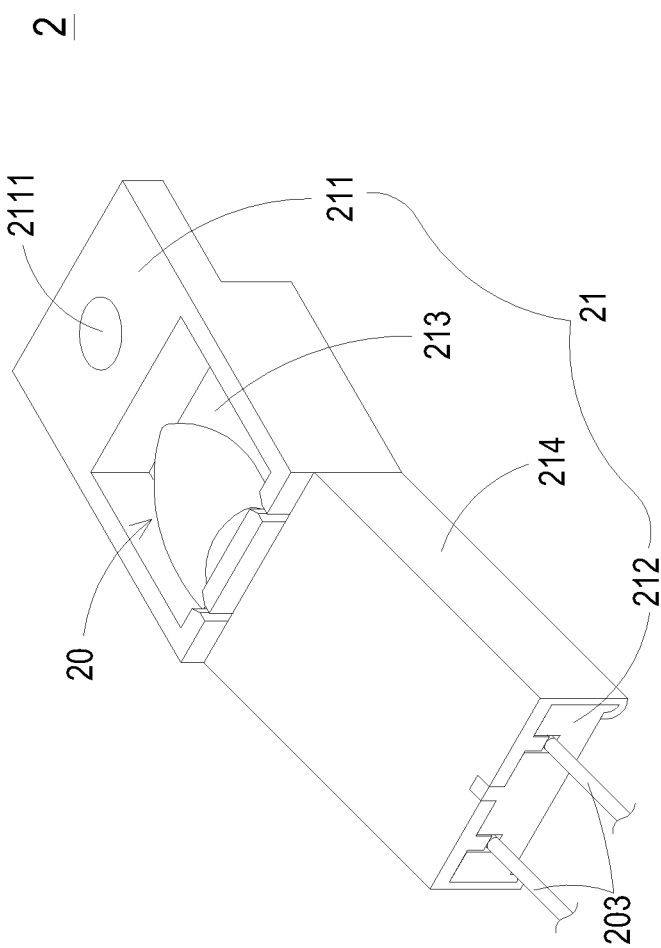
FIG. 2B is a schematic assembled view illustrating the temperature sensing module of FIG. 2A.

FIG. 2A is a schematic exploded view illustrating a temperature sensing module according to an embodiment of the present invention. FIG. 2B is a schematic assembled view illustrating the temperature sensing module of FIG. 2A. The temperature sensing module 2 is applied to an electronic device such as a power supply apparatus. As shown in FIG. 2A, the temperature sensing module 2 comprises a thermal sensor 20 and an auxiliary fixture member 21. An example of the thermal sensor 20 includes but is not limited to a thermistor. The thermal sensor 20 comprises a sensing head 201 (i.e. a main body) and plural pins 202. The auxiliary fixture member 21 comprises a fixing part 211, an extension part 212, a receiving part 213 and a covering part 214. It is preferred that the fixing part 211, the extension part 212 and the receiving part 213 are integrally formed. The receiving part 213 is arranged between the fixing part 211 and the extension part 212. The fixing part 211 has a fixing hole 2111 (e.g. a screw hole). The receiving part 213 is a hollow structure with an opening 2131 and plural notches 2132. The extension part 212 comprises plural grooves 2121, a first positioning structure 2122 and plural protruding edges 2123. Preferably, the first positioning structure 2122 is a convex structure. These grooves 2121 are parallel with each other, and formed in the top surface 2124 of the extension part 212. In addition, the grooves 2121 are in communication with corresponding notches 2132 of the receiving part 213.

In this embodiment, the groove 2121 comprises several segments with different cross-sections. For example, the groove 2121 comprises a first segment 2121a and a second segment 2121b. The first segment 2121a is narrower than the second segment 2121b. The first positioning structure 2122 is arranged on a first end of the top surface 2124 of the extension part 212, wherein the first end of the top surface 2124 is distant from the receiving part 213. In addition, the first positioning structure 2122 is arranged between the second segments 2121b of the grooves 2121. The protruding edges 2123 are arranged on bilateral sides of a bottom surface 2125 of the extension part 212 to be engaged with the covering part 214.

The covering part 214 comprises a slab 2141. Corresponding to the grooves 2121 of the extension part 212, two ribs 2142 are formed on the inner surface of the slab 2141. The ribs 2142 are elongated structures mating with corresponding grooves 2121. In addition, corresponding to the first positioning structure 2122 of the extension part 212, a second positioning structure 2143 is formed on an edge of the slab 2141. Preferably, the second positioning structure 2143 is a concave structure. When the covering part 214 is disposed over the extension part 212, the first positioning structure 2122 and the second positioning structure 2143 are engaged with each other to prevent from or limit horizontal movement of the covering part 214 with respect to the extension part 212. Moreover, plural buckling structures 2144 are extended vertically and downwardly from bilateral sides of the slab 2141.

Hereinafter, a process of assembling the temperature sensing module of the present invention will be illustrated with reference to FIGS. 2A and 2B. Firstly, the pins 202 of the thermal sensor 20 are connected with respective wires 203 by welding so that plural connecting regions 204 are created between the pins 202 and respective wires 203. Then, the sensing head 201 of the thermal sensor 20 is accommodated within the receiving part 213; the pins 202 are partially accommodated within the notches 2132 of the receiving part 213 and the first segments 2121a of the grooves 2121 of the extension part 212; the connecting regions 204 are accommodated within the second segments 2121b of the grooves 2121; and the wires 203 are partially accommodated within the second segments 2121b of the grooves 2121. Afterwards, the buckling structures 2144 of the covering part 214 and the protruding edges 2123 of the extension part 212 are engaged with each other, thereby preventing from or limiting vertical movement of the covering part 214 with respect to the extension part 212. After the covering part 214 is assembled with the extension part 212, the pins 202, the connecting regions 204 and the wires 203 are pressed by the ribs 2142 of the covering part 214 so that the pins 202, the connecting regions 204 and the wires 203 are firmly fixed between the covering part 214 and the extension part 212. At the same time, the first positioning structure 2122 of the extension part 212 and the second positioning structure 2143 of the covering part 214 are engaged with each other, thereby preventing from or limiting horizontal movement of the covering part 214 with respect to the extension part 212. The resulting structure of the assembled temperature sensing module 2 is shown in FIG. 2B.

FIG. 3 is a schematic cross-sectional view illustrating the temperature sensing module of FIG. 2 fixed on a heat sink. By penetrating a fastening element 30 (a screw) through the fixing hole 2111 of the fixing part 211 and tightening the fastening element 30 in a corresponding screw hole (not shown) of the heat sink 31, the auxiliary fixture member 21 is fixed on the heat sink 31. In such way, the receiving part 213 and the sensing head 201 of the thermal sensor 20 are completely attached on the surface of the heat sink 31. Meanwhile, the temperature sensing module 2 is securely fixed on the heat sink 31. In this embodiment, an inclined angle 215 is defined between the extension part 212 and the receiving part 213 (see FIG. 2A and FIG. 3). In such way, the sensing head 201 of the thermal sensor 20 can be completely attached on the surface of the heat sink 31. As a consequence, temperature of the surface of the heat sink 31 can be detected by the sensing head 201 of the thermal sensor 20 more accurately.

From the above description, since the pins, the connecting regions and the wires accommodated within the grooves are pressed by the ribs of the covering part, the pins, the connecting regions and the wires can be firmly fixed between the covering part and the extension part. In such way, the process of assembling the temperature sensing module is simplified, labor-saving and time-saving, and thus the product throughput is enhanced. Moreover, after the extension part is covered by the covering part, the pins are isolated from each other. As a consequence, the insulating tubes used in the prior art can be omitted, and the reliability of the electronic device will be enhanced. Moreover, due to the inclined angle between the extension part and the receiving part, the sensing head can be completely contacted with the surface of the heat sink. As a consequence, the temperature of the surface of the heat sink can be accurately detected by the sensing head of the thermal sensor.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A temperature sensing module, comprising:
a thermal sensor comprising a sensing head and plural pins, wherein said pins and respective wires are connected with each other to form plural connecting regions; and
an auxiliary fixture member comprising:
    a fixing part;
    an extension part comprising plural grooves for partially accommodating said pins of said thermal sensor, said wires and said connecting regions;
    a receiving part arranged between said fixing part and said extension part for accommodating said sensing head of said thermal sensor; and
    a covering part comprising plural ribs corresponding to said grooves and plural buckling structures, wherein after said covering part is assembled with said extension part by said buckling structures, said pins, said wires and said connecting regions accommodated within said grooves of said extension part are pressed by said ribs.

2. The temperature sensing module according to claim 1, wherein said temperature sensing module is installed on a heat sink, and said fixing part of said auxiliary fixture member further comprises a fixing hole, wherein by penetrating a fastening element through said fixing hole and tightening said fastening element in said heat sink, said auxiliary fixture member is fixed on said heat sink.

3. The temperature sensing module according to claim 1, wherein said fixing part, said extension part and said receiving part of said auxiliary fixture member are integrally formed.

4. The temperature sensing module according to claim 1, wherein said receiving part of said auxiliary fixture member is a hollow structure with an opening.

5. The temperature sensing module according to claim 1, wherein there is an inclined angle between said extension part and said receiving part.

6. The temperature sensing module according to claim 1, wherein said buckling structures are extended vertically from bilateral sides of said covering part, and two protruding edges are arranged on bilateral sides of a bottom surface of said extension part and corresponding to said buckling structures, wherein said buckling structures and said protruding edges are engaged with each other so as to limit a vertical movement of said covering part with respect to said extension part.

7. The temperature sensing module according to claim 1, wherein said receiving part further comprises plural notches, which are in communication with respective grooves of said extension part for partially accommodating respective pins.

8. The temperature sensing module according to claim 1, wherein each of said grooves of said extension part is formed in a top surface of said extension part, and comprises a first segment and a second segment, wherein said first segment is narrower than said second segment, wherein said pins are partially accommodated within respective first segments, said wires are partially accommodated within respective second segments, and said connecting regions are accommodated within respective second segments.

9. The temperature sensing module according to claim 8, wherein said extension part further comprises a first positioning structure, and said covering part further comprises a second positioning structure, wherein after said extension part is covered by said covering part, said first positioning structure and said second positioning structure are engaged with each other so as to limit a horizontal movement of said covering part with respect to said extension part.

10. The temperature sensing module according to claim 9, wherein said first positioning structure is a convex structure arranged on said top surface of said extension part and between said second segments of said grooves, and said second positioning structure is a concave structure formed on a slab of said covering part and corresponding to said convex structure.

11. An auxiliary fixture member for facilitating fixing a thermal sensor on a surface of a heat sink, said thermal sensor comprising a sensing head and plural pins, said pins and respective wires being connected with each other to form plural connecting regions, said auxiliary fixture member comprising:
a fixing part;
an extension part comprising plural grooves for partially accommodating said pins of said thermal sensor, said wires and said connecting regions;
a receiving part arranged between said fixing part and said extension part for accommodating said sensing head of said thermal sensor; and
a covering part comprising plural ribs corresponding to said grooves and plural buckling structures, wherein after said covering part is assembled with said extension part by said buckling structures, said pins, said wires and said connecting regions accommodated within said grooves of said extension part are pressed by said ribs.

12. The auxiliary fixture member according to claim 11, wherein said fixing part further comprises a fixing hole, wherein by penetrating a fastening element through said fixing hole and tightening said fastening element in said heat sink, said auxiliary fixture member is fixed on said heat sink.

13. The auxiliary fixture member according to claim 11, wherein said fixing part, said extension part and said receiving part are integrally formed.

14. The auxiliary fixture member according to claim 11, wherein said receiving part is a hollow structure with an opening.

15. The auxiliary fixture member according to claim 11, wherein there is an inclined angle between said extension part and said receiving part.

16. The auxiliary fixture member according to claim 11, wherein said buckling structures are extended vertically from bilateral sides of said covering part, and two protruding edges are arranged on bilateral sides of a bottom surface of said extension part and corresponding to said buckling structures, wherein said buckling structures and said protruding edges are engaged with each other so as to limit a vertical movement of said covering part with respect to said extension part.

17. The auxiliary fixture member according to claim 11, wherein said receiving part further comprises plural notches, which are in communication with respective grooves of said extension part for partially accommodating respective pins.

18. The auxiliary fixture member according to claim 11, wherein each of said grooves of said extension part is formed in a top surface of said extension part, and comprises a first segment and a second segment, wherein said first segment is narrower than said second segment, wherein said pins are partially accommodated within respective first segments, said wires are partially accommodated within respective second segments, and said connecting regions are accommodated within respective second segments.

19. The auxiliary fixture member according to claim 18, wherein said extension part further comprises a first positioning structure, and said covering part further comprises a second positioning structure, wherein after said extension part is covered by said covering part, said first positioning structure and said second positioning structure are engaged with each other so as to limit a horizontal movement of said covering part with respect to said extension part.

20. The auxiliary fixture member according to claim 19, wherein said first positioning structure is a convex structure arranged on said top surface of said extension part and between said second segments of said grooves, and said second positioning structure is a concave structure formed on a slab of said covering part and corresponding to said convex structure.

* * * * *